United States Patent Office 2,767,840
Patented Oct. 23, 1956

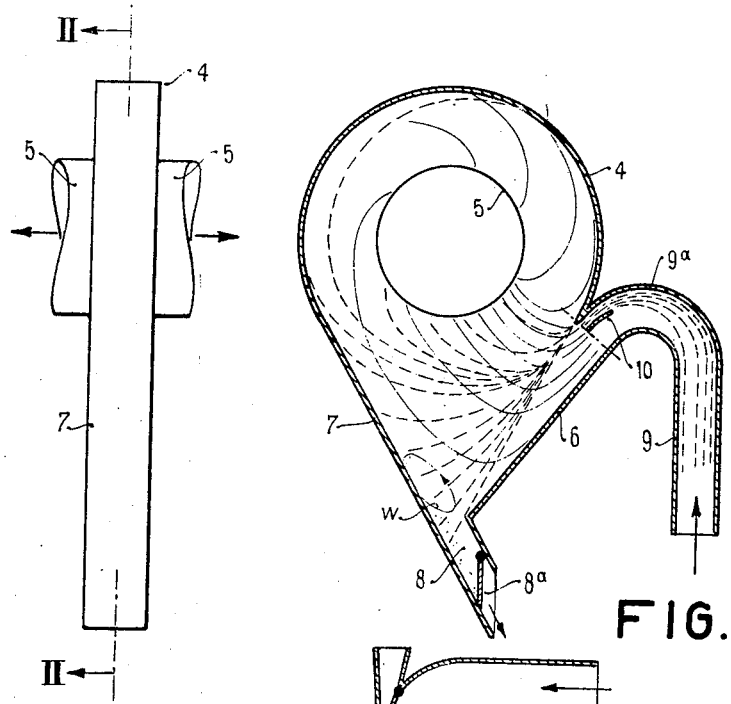
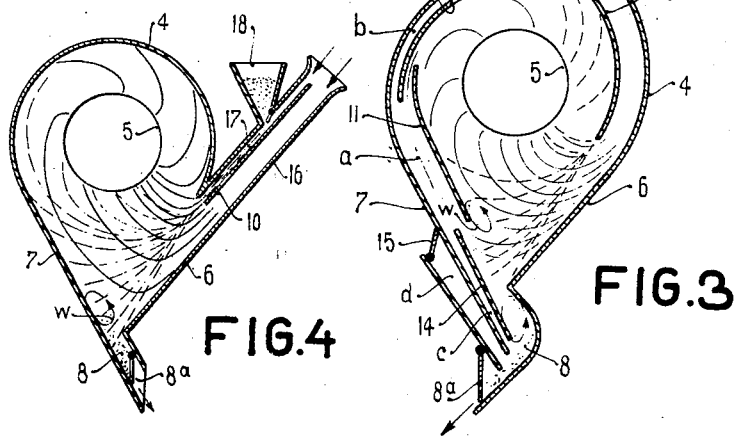

2,767,840

CYCLONES

Richard D. Dobson, Winterswijk, and Hendrik van der Kolk, Heemstede, Netherlands, assignors to Bureau van Tongeren N. V., Heemstede, Netherlands, a company of the Netherlands Application September 29, 1952, Serial No. 312,116

Claims priority, application Netherlands October 19, 1951

6 Claims. (Cl. 209—144)

The U. S. patent specification 2,265,707 discloses a pneumatic device for separating comminuted solid material, which is suspended in a fluid in motion, from said fluid, so that it is prevented from being carried into and through the exhauster by which the fluid is caused to flow. Said device is constituted as a cyclone supported with its axis in a horizontal plane and having a restricted size in axial direction, the separating chamber being composed of a substantially cylindrical portion merging, in downward direction, into a funnel portion having a valved bottom opening. The solids containing fluid intake duct opens tangentially into said cylindrical portion of the separating chamber, which is provided with a fluid exhaust duct opening into one of its flat side walls and communicating with the intake duct of an exhauster. In the said cylindrical portion, the solids will be thrown towards the curved front wall of this portion and directed downwardly towards the funnel, from which they are periodically discharged by automatic means. A substantially vertical baffle extending between the flat side walls prevents solid material from passing into the fluid exhaust duct with the transmitting fluid and directs any material, which impinges against it, downwardly towards the solids discharge opening.

The present invention relates to a cyclone by means of which solids in comminuted form, hereinafter to be termed "dust," can be separated into two fractions, hereinafter to be termed "fines" and "coarse material," it being understood that the dust entering the cyclone is suspended in a gaseous fluid (hereinafter to be termed "air"), or in a liquid.

In broad outline, our novel cyclone resembles, as far as its operation is concerned, the pneumatic device disclosed by the aforesaid U. S. A. specification 2,265,707, from which it differs, however, in that the air enters the funnel-shaped portion of the separating space in two layers, of which the innermost layer contains at least the major portion of the dust, whereas the outermost layer contains a relatively small amount thereof. If the dust to be separated has been stored in a bunker, it may be suspended in the innermost layer of air just before said layer enters the cyclone, but if it has already been suspended in air, such as is often the case, for instance with dust delivered by a mill, the suspension of fines and coarse material may be fed into the cyclone in such manner as to form the inner layer, in which case the outer layer may be formed by clean or practically dustfree additional air from another source.

If the dust concentration of the suspension is relatively low, the cyclone should be amply dimensioned, since its size is determined by the volume of air supplied thereto per unit of time, and not by the dust concentration therein. In such case it is desirable for the suspension to be separated, before entering the cyclone, into an inner layer containing the major portion of the dust, and an outer layer having a relatively low dust concentration, the advantage thereof being that the cyclone has not to handle any extra amount of air from another source. Said separation can be brought about by the provision of an elbow in the suspension supply pipe, said elbow being so arranged that the direction of rotation of the air flowing therethrough is opposite to that of the vortex in the cyclone. In said elbow, the major part of the dust, more especially the coarser particles thereof, will be thrown outward, whereby the suspension is separated into an outer layer whose dust concentration is relatively high, and an inner layer of relatively low dust concentration.

Owing to the stated fact that the direction of rotation of the suspension in the elbow is opposite to that of the vortex in the cylindrical portion of the separating chamber of the cyclone, it will be understood that the layer flowing along the outer wall of the elbow will become the inner layer in said portion of the separating chamber, and vice versa. In the separating chamber, the dust in the inner layer of the suspension has a tendency, owing to its inertia, to be thrown directly towards the dust discharge opening at the bottom of the funnel, but on its path to said opening it has to cross the air of the outer layer, which is drawn towards the air outlet duct. This flow of air sifts the fines out of said dust, so that the fines are taken up in the vortex whirling around the air outlet opening and discharged therethrough. The coarser particles of these fines in the vortex are likely to be thrown outwards so as to impinge against the cylindrical shell of the separating chamber and be directed thereby downwardly towards the region wherein the concentrated dust laden air enters said chamber, whereby they are again subjected to the sifting operation.

The result is a highly satisfactory separation between the fines and the coarse material or oversize.

Figs. 1 and 2 of the accompanying, more or less diagrammatic drawing illustrate a first embodiment of our invention, Fig. 1 being a rear view thereof and Fig. 2 a section along the line II—II in Fig. 1.

Fig. 3 illustrates, in a section similar to that shown in Fig. 2, a second embodiment, and Fig. 4 is a similar sectional view of a third embodiment.

In Figs. 1 and 2, the numeral 4 designates the cylindrical portion of the separating chamber, whose air outlet opening is denoted by 5. Such an opening, as shown in Fig. 1, is provided in both flat side walls of said chamber, but it will be understood that it may be provided in only one of said walls. The flat front and rear walls of the funnel portion of the separating chamber are indicated by 6 and 7, respectively. The funnel merges into a dust discharge passage 8 provided with a flap valve 8a.

The dust laden supply duct 9 extends vertically upwards on the front side (in Fig. 2 on the right hand side) of the separating chamber of the cyclone. This duct opens tangentially into the chamber 4 through an elbow 9a at or near the lower end of the cylindrical front wall of said chamber. Provided in said elbow is a partition 10 in substantially parallel relation with the curved outer wall portion of said elbow.

The suspension, i. e. the mixture of air and dust supplied by duct 9 may be regarded as homogeneous. In the elbow 9a, however, the major part of the dust is thrown outwards by centrifugal force, so that this dust, still suspended in air, flows over the partition 10 when reaching the separating chamber, whereas the air passing below said partition is relatively clean. In the said chamber, therefore, the dust laden air forms the inner layer and the substantially clean air forms the outer layer. Both layers are drawn towards the air discharge opening 5 so as to form, within the separating chamber, a vortex indicated by the thin full lines in Fig. 2, the approximate paths of the dust particles being indicated by thin dash lines.

The coarse solid material suspended in the inner layer is for by far the greater part directly thrown towards the dust discharge passage 8, but a relatively small portion thereof will be carried along by the said vortex, together with the fines. It will be understood that on its way to the discharge opening 5 the air contained in both layers will have to cross the path of the downwardly moving dust, so as to sift out the fines therefrom. The coarser particles not directly dropping down into the solids discharge passage 8 enter the cylindrical portion of chamber 4 and, together with a small amount of fines, impinge against the curved wall of said chamber so as to again reach the mouth of the elbow 9a. The major part of the fines is discharged, together with the air, through the opening 5.

The character *w* denotes a small eddy caused by the air impinging against the rear wall 7 of the funnel, and this eddy promotes the downward movement of the coarse material thrown against said wall.

The cyclone just described operates satisfactorily for various purposes, but its efficiency is rather low. Fig. 3, however, illustrates a cyclone meeting very strict requirements in this respect. In this figure, like parts have been designated by the same references as in Figs. 1 and 2.

In accordance with Fig. 3, the elbow 9a opens into the separating chamber 4 at the top thereof and the partition 10 provided therein extends, as a baffle, through a considerable distance into said chamber, in parallel relation with the curved front wall 4, up to the top of the funnel 6, 7.

Provided in the separating chamber is a second baffle 11 spaced from and substantially parallel with the rear wall of the said chamber, the bottom edge of said partition being sufficiently spaced from the wall 6 so as permit the passage of the coarse material which directly drops down into the dust discharge passage 8. The fines accompanying said coarse material are likely to be picked up by the air drawn towards the air outlet 5 through the passage *a* between the baffle 11 and the rear wall of the separating chamber.

Another baffle 12, provided in the cylindrical portion of the separating chamber in parallel relation with the curved rear wall of said portion, dips into the upper part of the passage *a* and extends upwards to the edge 13, where the outer layer from the elbow 9a enters the separating chamber to form the inner layer therein. The passage confined by said baffle 12 and the rear wall of the cyclone is designated by *b*, it being understood that the width of *a* exceeds the width of *b*. Obviously, therefore, part of the dust laden air flowing in upward direction through the passage *a* enters the passage *b* and is thus discharged into the flow of dust laden air supplied to the cyclone by the elbow 9a. In absence of the baffle 12 the dust laden air from the passage *a* would for the greater part be carried along with the vortex and prematurely escape through the outlet 5, together with the coarser particles that it may contain.

Provided a small distance inwards from the baffle 11 and in parallel relation therewith is a third baffle 14 extending upwards to the lower edge of baffle 11. The passage *c*, which is defined by the baffle 14 and the funnel wall 7 and has a width smaller than that of passage *a*, permits the dropping from the passage *a* to reach the discharge passage 8, even if air flows therethrough.

Finally, a passage *d* is provided on the outside of the funnel wall 7. This passage, which is adapted to be closed at its top by a flap valve 15, opens into the dust discharge passage 8 so as to allow atmospheric air to be supplied to the cyclone and to flow over the layer of dust that moves downwards on the front, i. e. the right hand side wall of the passage 8, without interfering with the discharge of the dust. The air inflowing through the passage 8 impinges against a front wall portion of passage 8 that is at substantially right angles to the funnel wall 6, whereby an eddy is set up between said front wall portion and the lower portion of the baffle 14, and since this eddy rotates in anticlockwise direction, it promotes the discharge of dust also during the periods wherein the valve 15 is open.

From the above it follows that in a device in accordance with Fig. 3 dust laden air enters the separating chamber not only at the edge 13 and at the lower edge of the baffle 10, but also from the passage *b* and at the top edge of the baffle 11. Owing thereto, the vortex is kept in strong rotation, and this favorably affects the capacity of the device.

Fig. 4 shows that it is possible, without the use of an elbow in the suspension supply duct, to feed the separating chamber with an inner layer of dust laden air and with an outer layer of more or less clean air. This figure corresponds with Fig. 2, it being understood, however, that the bent supply duct 9, 9a shown in Fig. 2 has been substituted by a relatively short, straight pipe section 16 open at its free end. This pipe section has a downward incline, opens tangentially into the cylindrical portion of the separating chamber 4 and is separated, by a partition 10, into two segments.

A hopper 18 opening into the upper segment of the pipe section 16 serves to feed the dust to be separated into said segment, so that this dust is carried towards the cyclone by air drawn into the pipe section 16, whereas clean air is supplied through the segment below partition 10.

What we claim is:

1. A cyclone having its axis disposed in a substantially horizontal plane and comprising a separating chamber composed of a substantially cylindrical hollow portion and of a funnel-shaped portion in fully open communication with the cylindrical portion and provided with a solids discharge passage, a suspension intake duct tangentially opening into said cylindrical portion said cylindrical portion having an unobstructed major central area, a fluid exhaust duct in fluid communication with the center of the cylindrical portion and disposed approximately coaxially with said cylindrical portion, and means associated with said intake duct to cause the suspension entering the separating chamber to comprise an inner stream having a relatively high solids concentration and an outer stream having a relatively low solids concentration.

2. A device as claimed in claim 1, characterised in that the suspension intake duct is provided, close to the separating chamber, with an elbow whose curvature is such as to cause the fluid flowing in said elbow to rotate in a direction opposite that of the vortex in the separating chamber.

3. A device as claimed in claim 1, characterised in that the suspension intake duct is provided, close to the separating chamber, with a partition wall forming an inner and an outer space relatively to the separating chamber, the inner space being provided with a feed hopper for supplying comminuted solids thereto.

4. A device as claimed in claim 2, characterised in that the suspension intake duct opens into the separation chamber in the region of the top thereof and is provided with a first baffle extending into said chamber, in substantially parallel and spaced relation with the curved front wall of the chamber, up to the funnel-shaped portion of said chamber.

5. A cyclone having its axis disposed in a substantially horizontal plane and comprising a separating chamber including a substantially cylindrical hollow portion having an unobstructed major central area and a funnel-shaped portion in fully open communication with the cylindrical portion and provided with a solids discharge passage, a suspension intake duct associated with said separating chamber and tangentially opening into said cylindrical portion, a fluid exhaust means disposed at the center of the cylindrical portion and arranged approximately coaxially and in fluid communication therewith, and means operatively associated with said intake duct for causing the suspension passing from the duct and entering the cylindrical portion to comprise an inner and outer stream, said inner stream having a relatively high solids concentration and said outer stream having a relatively low solids concentration.

6. A cyclone having its axis disposed in a substantially horizontal plane and comprising a separating chamber composed of a substantially cylindrical portion and of a funnel-shaped portion in fully open communication with the cylindrical portion at its bottom and provided with a solids discharge passage, a fluid and material suspension intake duct having an elbow tangentially opening into the top of said cylindrical portion, a feed hopper for supplying comminuted solid material to the intake duct, a partition wall arranged axially of said intake duct forming an inner and an outer space relative to the separating chamber, a baffle constituting a prolongation of the partition wall and extending into said chamber in parallel and spaced relation with the curved front wall of the cylindrical portion up to the funnel-shaped portion of said chamber, said cylindrical portion having an unobstructed major central area bounded at one point by the baffle and a fluid exhaust duct in fluid communication with the center of the cylindrical portion and disposed approximately coaxially with said cylindrical portion, the curvature of the elbow being such as to cause the fluid flowing in said elbow to rotate in a direction opposite that of the vortex in the separating chamber, said elbow and partition wall causing the suspension entering the separating chamber to comprise an inner stream having a relatively high solids concentration and an outer stream having a relatively low solids concentration.

References Cited in the file of this patent

UNITED STATES PATENTS

| | | |
|---|---|---|
| 390,100 | Smith | Sept. 25, 1888 |
| 535,099 | Gale et al. | Mar. 5, 1895 |
| 840,301 | Cook | Jan. 1, 1907 |
| 963,845 | Wolf | July 12, 1910 |
| 1,600,762 | Hawley | Sept. 21, 1926 |
| 1,997,125 | Soyez et al. | Apr. 9, 1935 |
| 2,170,704 | Bourne | Aug. 22, 1939 |
| 2,265,707 | Wall | Dec. 9, 1941 |

FOREIGN PATENTS

| | | |
|---|---|---|
| 22,801 | Great Britain | Oct. 27, 1908 |
| 324,260 | Germany | Aug. 23, 1920 |
| 571,222 | Great Britain | Aug. 13, 1945 |
| 655,780 | Germany | Jan. 22, 1938 |
| 693,999 | Great Britain | July 8, 1953 |